US011866332B2

(12) United States Patent
Guo et al.

(10) Patent No.: US 11,866,332 B2
(45) Date of Patent: Jan. 9, 2024

(54) CARBON NANOPARTICLE-POROUS SKELETON COMPOSITE MATERIAL, ITS COMPOSITE WITH LITHIUM METAL, AND THEIR PREPARATION METHODS AND USE

(71) Applicant: China Energy CAS Technology Co., Ltd., Tianjin (CN)

(72) Inventors: Feng Guo, Jiangsu (CN); Yalong Wang, Jiangsu (CN); Tuo Kang, Jiangsu (CN); Chenghao Liu, Jiangsu (CN); Peng Chen, Jiangsu (CN); Yanbin Shen, Jiangsu (CN); Wei Lu, Jiangsu (CN); Liwei Chen, Jiangsu (CN)

(73) Assignee: CHINA ENERGY CAS TECHNOLOGY CO., LTD., Tianjin (CN)

(*) Notice: Subject to any disclaimer, the term of this patent is extended or adjusted under 35 U.S.C. 154(b) by 0 days.

(21) Appl. No.: 17/733,367

(22) Filed: Apr. 29, 2022

(65) Prior Publication Data

US 2022/0259046 A1 Aug. 18, 2022

Related U.S. Application Data

(63) Continuation of application No. 16/477,791, filed as application No. PCT/CN2017/105676 on Oct. 11, 2017, now abandoned.

(30) Foreign Application Priority Data

Jul. 26, 2017 (CN) .......................... 201710617358.2

(51) Int. Cl.
*C01B 32/168* (2017.01)
*H01M 4/36* (2006.01)
(Continued)

(52) U.S. Cl.
CPC ........... *C01B 32/168* (2017.08); *H01M 4/362* (2013.01); *H01M 4/382* (2013.01); *H01M 4/583* (2013.01);
(Continued)

(58) Field of Classification Search
CPC .. C01B 32/168; C01B 2202/36; H01M 4/362; H01M 4/382; H01M 4/583;
(Continued)

(56) References Cited

U.S. PATENT DOCUMENTS 4,994,334 A 2/1991 Ikoma
2003/0031923 A1 2/2003 Aoshima
(Continued)

FOREIGN PATENT DOCUMENTS

CN 1770515 5/2006
CN 101397652 4/2009
(Continued)

OTHER PUBLICATIONS

Office Action issued in Chinese Patent Application No. 201710617358. 2, dated Feb. 2, 2021.
(Continued)

*Primary Examiner* — Lucas J. O'Donnell
(74) *Attorney, Agent, or Firm* — Pillsbury Winthrop Shaw Pittman, LLP

(57) ABSTRACT

Carbon nanoparticle-porous skeleton composite material, its composite with lithium metal, and their preparation methods and use A carbon nanoparticle-porous skeleton composite material, its composite with lithium metal, and their preparation methods and use. In the carbon nanoparticle-porous skeleton composite material, the porous skeleton is a carbon-based porous microsphere material with a diameter of 1 to 100 μm or a porous metal material having internal pores with a micrometer-scale pore size distribution, and the
(Continued)

carbon nanoparticles are distributed in pores and on the surface of the carbon-based porous microsphere material or the porous metal material. The carbon nanoparticle-porous skeleton composite material is mixed with a molten lithium metal to form a lithium-carbon nanoparticle-porous skeleton composite material. The carbon nanoparticles present in the material can better conduct lithium ions during the battery cycle, thereby inhibiting the formation of lithium dendrites, and improving the safety and cycle stability of the battery.

16 Claims, 7 Drawing Sheets

(51) Int. Cl.
  *H01M 4/38* (2006.01)
  *H01M 4/583* (2010.01)
  *H01M 4/86* (2006.01)
  *H01M 10/0525* (2010.01)
  *B82Y 30/00* (2011.01)

(52) U.S. Cl.
  CPC ..... *H01M 4/8605* (2013.01); *H01M 10/0525* (2013.01); *B82Y 30/00* (2013.01); *C01B 2202/36* (2013.01); *C01P 2004/13* (2013.01); *C01P 2004/32* (2013.01); *C01P 2004/61* (2013.01); *C01P 2006/17* (2013.01)

(58) Field of Classification Search
  CPC . H01M 4/8605; H01M 10/0525; B82Y 30/00; C01P 2004/13; C01P 2004/32; C01P 2004/61; C01P 2006/17
  See application file for complete search history.

(56) References Cited

U.S. PATENT DOCUMENTS

| | | |
|---|---|---|
| 2013/0163146 A1 | 6/2013 | Lee et al. |
| 2013/0183511 A1 | 7/2013 | Dai et al. |
| 2013/0224594 A1 | 8/2013 | Yushin |
| 2014/0186522 A1 | 7/2014 | Woo et al. |
| 2017/0110719 A1 | 4/2017 | Wang |
| 2017/0133717 A1 | 5/2017 | Makino |
| 2017/0187041 A1 | 6/2017 | Yamada et al. |
| 2017/0214053 A1 | 7/2017 | Kim et al. |

FOREIGN PATENT DOCUMENTS

| | | |
|---|---|---|
| CN | 101397652 A | 4/2009 |
| CN | 102089240 A | 6/2011 |
| CN | 102437313 | 5/2012 |
| CN | 103415953 A | 11/2013 |
| CN | 104925778 | 9/2015 |
| CN | 105374991 | 3/2016 |
| CN | 105552382 | 5/2016 |
| CN | 105779804 A | 7/2016 |
| CN | 106033815 A | 10/2016 |
| CN | 106684342 A | 5/2017 |
| CN | 106711456 | 5/2017 |
| CN | 106711456 A | 5/2017 |
| JP | 2005142004 | 6/2005 |
| JP | 2013135223 | 7/2013 |
| KR | 20160145605 | 12/2016 |
| WO | 2015139660 | 9/2015 |
| WO | 2017/029692 A1 | 2/2017 |
| WO | 2019/019411 A1 | 1/2019 |

OTHER PUBLICATIONS

International Search Report as issued in International Patent Application No. PCT/CN2017/105676, dated Apr. 17, 2018.
Written Opinion of the International Searching Authority as issued in International Patent Application No. PCT/CN2017/105676, dated Apr. 17, 2018.
Xu, W., et al., "Lithium metal anodes for rechargeable batteries," Energy & Environmental Science, Royal Society of Chemistry, No. 7, pp. 513-537 (2014).
Lin, D., et al., "Reviving the lithium metal anode for high-energy batteries," Nature Nanotechnology, vol. 12, pp. 194-206 (Mar. 2017).
Chinese Office Action issued in corresponding Chinese Patent Application No. 201710617358.2, dated Feb. 2, 2021.
Japanese Office Action issued in corresponding Japanese Patent Application No. 2019-560436, dated May 10, 2021.
European Search Report issued in corresponding European Patent Application No. 17919284.4, dated Jun. 6, 2021.
M. Arakawa, "Particle size measurement introduction", Journal of the Society of Powder Technology, vol. 17, Issue 6, pp. 299-307 (1980).
Korean Office Action issued in corresponding Korean Patent Application No. 10-2019-7022378, dated Oct. 19, 2020.
Japanese Office Action issued in corresponding Japanese Patent Application No. 2019-560436, dated Nov. 16, 2020.
U.S. Office Action issued in corresponding U.S. Appl. No. 16/477,803, dated Dec. 20, 2021.
Xu et al., "Mesoporous Carbon-Carbon Nanotube-Sulfur Composite Microspheres for High-Areal-Capacity Lithium-Sulfer Battery Cathodes" ACS Appl. Mater. Interfaces, 5, 21, pp. 11355-11362 (2013).

US 11,866,332 B2

CARBON NANOPARTICLE-POROUS SKELETON COMPOSITE MATERIAL, ITS COMPOSITE WITH LITHIUM METAL, AND THEIR PREPARATION METHODS AND USE

This application is a continuation of U.S. patent application Ser. No. 16/477,791, filed on Jul. 12, 2019, which is the U.S. national phase entry of PCT Patent Application No. PCT/CN2017/105676, filed on Oct. 11, 2017, which claims the benefit of priority of Chinese Patent Application No. 201710617358.2, filed on Jul. 26, 2017, each of the foregoing applications is hereby incorporated in its entirety by reference.

TECHNICAL FIELD

The present disclosure relates to a nano-composite material, and particularly to a carbon nanoparticle-porous skeleton composite material, its composite with lithium metal, and their preparation methods and use.

BACKGROUND

Lithium batteries have been widely used in fields such as consumer electronics, electric vehicles, and energy storage, due to their advantages of high specific energy, long cycle life and the like. In current lithium batteries, compounds containing lithium are used as a positive electrode, and graphite is used as a negative electrode. However, the graphite-based negative electrode material has a specific capacity limit of about 370 mAh/g. It is difficult to further increase the energy density of a lithium battery using such negative electrode material, and it can hardly meet the market requirement for lithium batteries with a higher energy density. A metallic lithium negative electrode has a high specific capacity (3860 mAh/g) and a low electrode potential (−3.04 V vs. standard hydrogen electrode (SHE)), and such a lithium battery can therefore be widely used in fields such as consumer electronics, electric vehicles, and energy storage due to its high specific energy, long cycle life and high voltage. Because a metallic lithium negative electrode has a series of advantages of not only high specific capacity (3860 mAh/g) and low electrode potential (−3.04 V vs. SHE), but also low density (0.59 g/cm$^3$), a lithium battery using metallic lithium as a negative electrode may have a significantly improved energy density. Meanwhile, lithium ions can be provided when using metallic lithium as the negative electrode of the battery, as a result, a lithium-free material with a higher capacity, such as sulfur and air, can be used as the positive electrode.

However, in batteries with a metallic lithium negative electrode, dendrites and "dead lithium" are formed continuously during the cycle, leading to low coulombic efficiency and short cycle life. More importantly, the growth of the dendrites may puncture the separator, such that the positive electrode and the negative electrode are connected with each other and thus an internal short circuit occurs, which releases a large amount of heat, causing the battery to burn or even explode. The above problems greatly limit the use of metallic lithium negative electrodes in recent decades.

SUMMARY

A main object of the present disclosure is to provide a carbon nanoparticle-porous skeleton composite material, its composite with lithium metal, their preparation methods, an electrode and an electrochemical battery comprising the same, in order to inhibit the formation of metallic lithium dendrites, thereby improving the safety and/or cycle stability of the battery.

Embodiments of the present disclosure include the following.

In some embodiments, provided is a carbon nanoparticle-porous skeleton composite material, wherein the porous skeleton is a carbon-based porous microsphere material with a diameter of 1 to 100 μm or a porous metal material having internal pores with a micrometer-scale pore size distribution, and the carbon nanoparticles are distributed in the pores and on the surface of the carbon-based porous microsphere material or porous metal material.

In some embodiments, provided is a method for preparing the carbon nanoparticle-porous skeleton composite material, comprising: dispersing carbon nanotubes or carbon nanofibers in a solvent together with carbon nanoparticles to form a dispersion, and then spray drying the dispersion; or immersing microscale porous graphite, mesocarbon microspheres, porous activated carbon or a porous metal material in a solution containing carbon nanoparticles, sonicating and then drying the resultant.

In some embodiments, provided is a lithium-carbon nanoparticle-porous skeleton composite material, comprising the carbon nanoparticle-porous skeleton composite material described above, and metallic lithium distributed in the pores and on the surface of the carbon nanoparticle-porous skeleton composite material.

In some embodiments, provided is a method for preparing the metallic lithium-carbon nanoparticle-porous skeleton composite material, comprising: mixing a molten lithium metal with the carbon nanoparticle-porous skeleton composite material described above, and then cooling the mixture.

In some embodiments, provided is an electrode comprising the lithium-carbon nanoparticle-porous skeleton composite material described above.

In some embodiments, provided is an electrochemical energy storage device comprising the electrode described above, wherein the electrochemical energy storage device comprises an electrochemical battery or a super-capacitor.

The present disclosure has at least one of the following advantageous effects.

(1) The carbon nanoparticle-porous skeleton composite material can be mixed with molten lithium metal to form a lithium-carbon nanoparticle-porous skeleton composite material. The carbon nanoparticles present in the material can better conduct lithium ions during the battery cycle, thereby inhibiting the formation of lithium dendrites and improving the safety of the battery.

(2) The lithium-carbon nanoparticle-porous skeleton composite material can be used as negative electrode material of a battery, to improve the cycle stability of the battery.

(3) The preparation process is simple, suitable for mass production.

(4) The metallic lithium-carbon nanoparticle-porous skeleton composite material can be used in a variety of lithium batteries, and can be used in metallic lithium-oxide batteries, metallic lithium-polymer batteries, and rechargeable lithium ion batteries.

DETAILED DESCRIPTION

Figure 1:
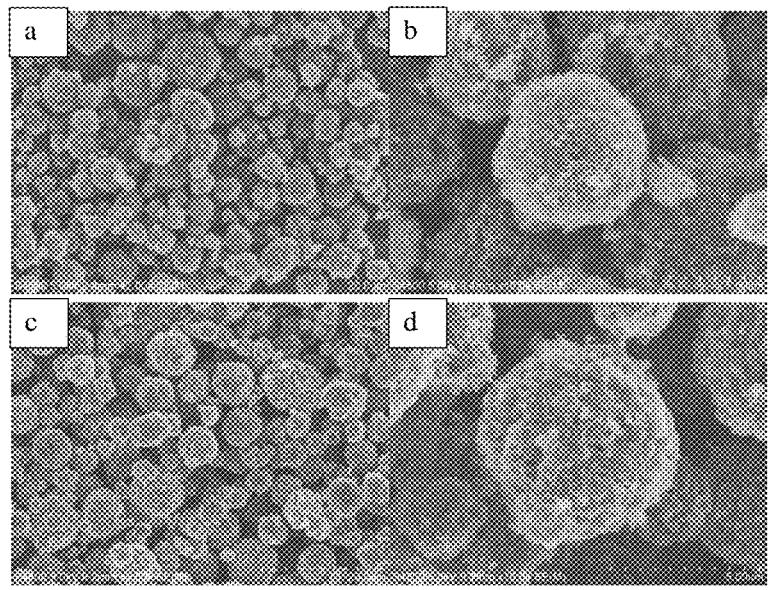
FIG. 1 shows scanning electron microscopy (SEM) images of acetylene black-carbon nanotube microsphere composite material (images a, b) and lithium-carbon composite microparticles (images c, d) obtained in Example 1.

Carbon Nanoparticle-Porous Skeleton Composite Material:

One aspect of the present disclosure provides a carbon nanoparticle-porous skeleton composite material, comprising a porous skeleton material composed of a carbon-based porous microsphere material with a diameter of 1 to 100 μm or a porous metal material having internal pores with a micrometer-scale pore size distribution, and carbon nanoparticles distributed in the pores and on the surface of the porous skeleton material.

In some embodiments, the carbon-based porous microsphere material comprises at least one selected from the group consisting of a carbon nanotube or carbon nanofiber microsphere material, graphite, mesocarbon microspheres and porous activated carbon.

In some embodiments, the carbon nanotube or carbon nanofiber microsphere material is formed by entangling and agglomerating carbon nanotubes or carbon nanofibers with each other, and has a large number of nanoscale pores in its interior and on its surface. Such microspheres have an approximately solid structure (similar to a wool ball structure). That is, the microsphere is full of carbon nanotubes or carbon nanofibers in its interior. However, there are nanoscale pores between the entangled and agglomerated carbon nanotubes or carbon nanofibers, and these pores can be used to accommodate carbon nanoparticles and metallic lithium particles.

In some embodiments, the carbon nanotube or carbon nanofiber microsphere material is spherical or spheroidal particles. The particles may have an average diameter of 1 μm to 100 μm, preferably 1 μm to 25 μm, and a specific surface area of 100 to 1500 m$^2$/g, preferably 150 to 500 m$^2$/g. The pores contained in the microspheres may have a pore size distribution of 1 to 200 nm, preferably 1 to 50 nm. The microspheres containing carbon nanoparticles do not vary significantly from the microspheres containing no carbon nanoparticles in the morphology and structure, only the pore volume decreases, for example, the pore volume decreases from 2.0 to 1.4 cm$^3$·g$^{-1}$.

In some embodiments, the carbon nanotube or carbon nanofiber microsphere material at least has any one selected from the group consisting of a microspherical entities agglomeration structure, a spherical agglomeration structure, a spheroidal agglomeration structure, a porous spherical agglomeration structure, and a donut-shaped agglomeration structure.

In some embodiments, the carbon nanotubes comprises any one selected from the group consisting of multiple-walled carbon nanotubes, double-walled carbon nanotubes and single-walled carbon nanotubes, or a combination of two or more of the foregoing, and optionally the carbon nanotubes are subjected to a surface functionalization treatment. The groups modifying the surface of the carbon nanotubes can be selected from, but not limited to, —COOH, —OH, —NH$_2$ groups and the like.

In some embodiments, the graphite, mesocarbon microspheres or porous activated carbon are sheet-like, spherical or spheroidal particles. The particles may have an average diameter of 50 μm to 500 μm, preferably 100 μm to 200 μm, and a specific surface area of 100 to 1000 m$^2$/g, preferably 100 to 500 m$^2$/g. The pores contained may have a pore size distribution of 20 to 500 nm, preferably 20 to 100 nm.

In some embodiments, the porous metal material comprises at least one selected from the group consisting of porous copper, porous aluminum, porous zinc, porous iron, porous nickel, porous gold, and porous silver.

In some embodiments, the pores contained in the porous metal material may have a pore size distribution of 100 to 1000 μm, preferably 100 to 500 μm; and the specific surface area may be 50 to 500 m$^2$/g, preferably 50 to 200 m$^2$/g.

In some embodiments, the carbon nanoparticles comprises at least one selected from the group consisting of carbon black (for example, Degussa carbon black), acetylene black, Ketjen black, Timcal Super P conductive additive, and Cabot BP2000 carbon black.

In some embodiments, the carbon nanoparticles may have a size of 1 to 500 nm, preferably 50 to 200 nm.

In some embodiments, the carbon nanoparticles in the carbon nanoparticle-porous skeleton composite material may have a content of 20 to 500 wt %, preferably 50 to 200 wt %, with respect to the porous skeleton.

Method for Preparing the Carbon Nanoparticle-Porous Skeleton Composite Material:

Another aspect of the present disclosure provides a method for preparing the carbon nanoparticle-porous skeleton composite material, the method comprising: dispersing carbon nanotubes or carbon nanofibers in a solvent together with carbon nanoparticles to form a dispersion, and then spray drying the dispersion; or immersing microscale porous graphite, mesocarbon microspheres, porous activated carbon or a porous metal material in a solution containing carbon nanoparticles, sonicating and then drying the resultant material.

In some embodiments, the carbon nanoparticle-carbon nanotube or carbon nanofiber microsphere composite material may be prepared by a spray drying method.

For example, the preparation method may comprise the steps of:
A. dispersing carbon nanotubes/carbon nanofibers and carbon nanoparticles in a dispersion solvent (surfactant-free) through a sonication treatment to obtain a dispersion;
B. spraying the dispersion obtained in step A out through a nozzle of a spray dryer, at a preset air inlet temperature and a preset air outlet temperature, wherein the dispersion is kept under stirring during spraying; and
C. cooling to obtain the carbon nanoparticle-carbon nanotube/carbon nanofiber microsphere composite material.

In some embodiments, a mass ratio between the carbon nanoparticles and the carbon nanotubes/carbon nanofibers in step A may be 0.5:1 to 8:1, preferably 0.5:1 to 5:1, and more preferably 0.5:1 to 2:1.

For "carbon nanoparticle" and "carbon nanotube/carbon nanofiber", reference can be made to the related description in the section of "carbon nanoparticle-porous skeleton composite material" above.

In some embodiments, a concentration of the carbon nanotubes/carbon nanofibers in the dispersion may be 10 to 50 g/L, preferably 10 to 15 g/L.

In some embodiments, as the solvent, organic and/or inorganic liquids capable of dispersing the carbon nanotubes/carbon nanofibers and the carbon nanoparticles uniformly may be used, for example, any one selected from the group consisting of water, aqueous ammonia, hydrochloric acid solution, ethanol, acetone, and isopropanol, or a combination thereof.

In some embodiments, the solvent may be a mixture of ethanol and water in a volume ratio of 1:10.

In some embodiments, the conditions for the spray drying may comprise: an air inlet temperature of 150 to 250° C., and an air outlet temperature of 75° C. or more, such as 75 to 150° C., or 90° C. or more. One preferred condition for the spray drying comprises: an air inlet temperature of 190 to 210° C. and an air outlet temperature of 90 to 110° C.

In some embodiments, the spray speed of the spray drying may be 1 mL/min to 100 L/min.

In some embodiments, microscale porous graphite, mesocarbon microspheres, porous activated carbon or a porous metal material is used as the porous skeleton material, and the carbon nanoparticle-porous skeleton composite material is prepared by using an impregnation and sonication method. The impregnation and sonication method may comprise: immersing the microscale porous graphite, mesocarbon microspheres, porous activated carbon or a porous metal material in a carbon nanoparticle solution, sonicating and then drying the resultant material.

In some embodiments, the carbon nanoparticle solution comprises a solution containing carbon nanoparticles in water or an ethanol solvent or in a mixed solvent of ethanol and water.

In some embodiments, a concentration of the carbon nanoparticles in the carbon nanoparticle solution may be 5 to 50 g/L, preferably 10 to 30 g/L.

Metallic Lithium-Carbon Nanoparticle-Porous Skeleton Composite Material

Another aspect of the present disclosure provides a metallic lithium-carbon nanoparticle-porous skeleton composite material, comprising the carbon nanoparticle-porous skeleton composite material described above, and metallic lithium distributed in the pores and on the surface of the carbon nanoparticle-porous skeleton composite material, wherein the carbon nanoparticle-porous skeleton composite material as a skeleton supports the metallic lithium, and the metallic lithium is present in the form of elementary substance in the pores or on the surface thereof (mainly in the pores, with less lithium on the surface).

In some embodiments, the metallic lithium is 1% to 95%, preferably 10% to 70%, and more preferably 20% to 70%, by mass of the total mass of the composite material.

Method for Preparing the Metallic Lithium-Carbon Nanoparticle-Porous Skeleton Composite Material Another aspect of the present disclosure provides a method for preparing the metallic lithium-carbon nanoparticle-porous skeleton composite material, the method comprising: mixing a molten lithium metal with the carbon nanoparticle-porous skeleton composite material described above, and then cooling the mixture.

In some embodiments, the mixing of the molten lithium metal with the carbon nanoparticle-carbon-based porous microsphere composite material may comprise mixing the lithium metal with the carbon-based porous microsphere material under stirring and heating.

In some embodiments, the mixing under stirring may comprise a pre-stirring step and a rapid stirring step, wherein the pre-stirring step comprises stirring a mixture of the lithium metal and the carbon nanoparticle-porous skeleton composite material at a low speed (for example, about 50 rpm to 100 rpm) at a relatively low temperature (for example, about 200° C. to 230° C.) for a short time period (for example, 1 to 5 minutes), and the rapid stirring step comprises stirring at a high speed (for example, about 150 rpm to 1000 rpm, preferably 200 rpm to 800 rpm) at a relatively high temperature (for example, about 230° C. to 300° C.).

For "carbon-based porous microsphere material", reference can be made to the related description in the section of "carbon nanoparticle-porous skeleton composite material".

In some embodiments, the mixing of the molten lithium metal with the carbon nanoparticle-porous metal composite material may comprise immersing the carbon nanoparticle-porous metal composite material in the molten lithium metal.

In some embodiments, the metallic lithium is 1% to 95%, preferably 10% to 70%, and more preferably 20% to 70%, by mass of the total mass of the composite material.

Use of the Metallic Lithium-Carbon Nanoparticle-Porous Skeleton Composite Material Another aspect of the present disclosure provides an electrode comprising the above-described metallic lithium-carbon nanoparticle-porous skeleton composite material as an electrode material.

In some embodiments, the metallic lithium-carbon nanoparticle-porous skeleton composite material may be used as a negative electrode active material of a battery or may be directly used as an electrode (in the case of using the porous metal skeleton).

Another aspect of the present disclosure provides an electrochemical energy storage device comprising the above-described electrode.

In some embodiments, the electrochemical energy storage device is an electrochemical battery, and the electrode is used as the negative electrode of the battery.

In some embodiments, the electrochemical battery comprises a lithium battery, a metallic lithium-oxide battery, a metallic lithium-sulfur secondary battery, or a metallic lithium-air battery.

In some embodiments, the electrochemical energy storage device is a super-capacitor, and the electrode is used as one electrode plate of the super-capacitor.

When the lithium-carbon nanoparticle-porous skeleton composite material provided in the present disclosure is used in the electrochemical battery, the carbon nanoparticles present in the material can better conduct lithium ions during the battery cycle, thereby inhibiting the formation of lithium dendrites, and improving the safety of the battery, as well as being able to improve the cycle stability of the battery.

Following particular embodiments are intended to illustrate, but not to limit, the present disclosure.

Embodiment 1 is a carbon nanoparticle-porous skeleton composite material, wherein the porous skeleton is a carbon-based porous microsphere material with a diameter of 1 to 100 μm or a porous metal material having internal pores with a micrometer-scale pore size distribution, and the carbon nanoparticles are distributed in the pores and on the surface of the carbon-based porous microsphere material or the porous metal material.

Embodiment 2 is the carbon nanoparticle-porous skeleton composite material according to embodiment 1, wherein the carbon-based porous microsphere material comprises at least one selected from the group consisting of a carbon nanotube or carbon nanofiber microsphere material, graphite, mesocarbon microspheres, and porous activated carbon, wherein the carbon nanotube or carbon nanofiber microsphere material is formed by entangling and agglomerating carbon nanotubes or carbon nanofibers with each other, and the microsphere is full of carbon nanotubes or carbon nanofibers in its interior, with a large number of nanoscale pores being present in its interior and on its surface; and/or the porous metal material comprises at least one selected from the group consisting of porous copper, porous aluminum, porous zinc, porous iron, porous nickel, porous gold, and porous silver; and/or the carbon nanoparticles comprise at least one selected from the group consisting of carbon black, acetylene black, Ketjen black, Timcal Super P conductive additive, and Cabot BP2000 carbon black.

Embodiment 3 is the carbon nanoparticle-porous skeleton composite material according to embodiment 1 or 2, wherein the carbon nanoparticles may have a size of 1 to 500 nm, preferably 50 to 200 nm.

Embodiment 4 is the carbon nanoparticle-porous skeleton composite material according to any one of embodiments 1 to 3, wherein the carbon nanoparticles have a content of 20 to 500 wt % with respect to the porous skeleton.

Embodiment 5 is the carbon nanoparticle-porous skeleton composite material according to any one of embodiments 2 to 4, wherein the carbon nanotube or carbon nanofiber microsphere material has a specific surface area of 100 to 1500 m$^2$/g; and/or the pores contained in the carbon nanotube or carbon nanofiber microsphere material have a pore size of 1 to 200 nm; and/or the carbon nanotube or carbon nanofiber microsphere material at least has any one selected from the group consisting of a microspherical entities agglomeration structure, a spherical agglomeration structure, a spheroidal agglomeration structure, a porous spherical agglomeration structure, and a donut-shaped agglomeration structure; and/or the carbon nanotubes comprises any one selected from the group consisting of multiple-walled carbon nanotubes, double-walled carbon nanotubes and single-walled carbon nanotubes, or a combination of two or more therefrom, and optionally the carbon nanotubes are subjected to a surface functionalization treatment.

Embodiment 6 is a method for preparing the carbon nanoparticle-porous skeleton composite material according to any one of embodiments 1 to 5, the method comprising:
dispersing carbon nanotubes or carbon nanofibers in a solvent together with carbon nanoparticles to form a dispersion, and then spray drying the dispersion; or
immersing microscale porous graphite, mesocarbon microspheres, porous activated carbon or a porous metal material in a solution containing carbon nanoparticles, sonicating and then drying the resultant material.

Embodiment 7 is the method according to embodiment 6, wherein a process of spray drying the carbon nanotubes or the carbon nanofibers together with the carbon nanoparticles comprises the steps of:
A. dispersing the carbon nanotubes/carbon nanofibers and the carbon nanoparticles in a dispersion solvent (surfactant-free) through a sonication treatment to obtain a dispersion;
B. spraying the dispersion obtained in step A out through a nozzle of a spray dryer, at a preset air inlet temperature and a preset air outlet temperature, wherein the dispersion is kept under stirring during the spraying; and
C. cooling the resultant material, thereby obtaining the carbon nanoparticle-carbon nanotube/carbon nanofiber microsphere composite material.

Embodiment 8 is the method according to embodiment 7, wherein a mass ratio between the carbon nanoparticles and the carbon nanotubes/carbon nanofibers in step A is 0.5:1 to 8:1; and/or a concentration of the carbon nanotubes/carbon nanofibers in the dispersion is 10 to 50 g/L; and/or the dispersion solvent comprises any one selected from the group consisting of water, aqueous ammonia, hydrochloric acid solution, ethanol, acetone, and isopropanol, or a combination thereof.

Embodiment 9 is the method according to embodiment 7 or 8, wherein the air inlet temperature is 190 to 210° C., and the air outlet temperature is 90 to 110° C.; and/or a speed of the spraying is 1 mL/min to 100 L/min.

Embodiment 8 is the method according to embodiment 6, wherein the solution containing carbon nanoparticles comprises an aqueous solution containing carbon nanoparticles; and/or a concentration of the carbon nanoparticles in the solution containing carbon nanoparticles is 5 to 50 g/L.

Embodiment 10 is a metallic lithium-carbon nanoparticle-porous skeleton composite material, which comprises the carbon nanoparticle-porous skeleton composite material according to any one of embodiments 1 to 5, and metallic lithium distributed in the pores and on the surface of the carbon nanoparticle-porous skeleton composite material.

Embodiment 11 is the lithium-carbon nanoparticle-porous skeleton composite material according to embodiment 10, wherein the metallic lithium is 1% to 95% by mass of the total mass of the lithium-carbon nanoparticle-porous skeleton composite material.

Embodiment 12 is a method for preparing a metallic lithium-carbon nanoparticle-porous skeleton composite material, the method comprising: mixing a molten lithium metal with the carbon nanoparticle-porous skeleton composite material according to any one of embodiments 1 to 5, and then cooling the mixture.

Embodiment 13 is the method according to embodiment 12, wherein the mixing of the molten lithium metal with the carbon nanoparticle-carbon-based porous microsphere composite material comprises:
mixing the lithium metal with the carbon-based porous microsphere material under stirring and heating; or
immersing the carbon nanoparticle-porous metal composite material in the molten lithium metal.

Embodiment 14 is the method according to embodiment 13, wherein the mixing under stirring comprises a pre-stirring step and a rapid stirring step, wherein the pre-stirring step comprises stirring a mixture of the lithium metal and the carbon nanoparticle-porous skeleton composite material at a speed of 50 rpm to 100 rpm at 200° C. to 230° C. for 1 to 5 minutes, and the rapid stirring step comprises rapidly stirring at a speed of 150 rpm to 1000 rpm at 230° C. to 300° C.

Embodiment 15 is an electrode comprising the lithium-carbon nanoparticle-porous skeleton composite material according to embodiment 10 or 11.

Embodiment 16 is an electrochemical energy storage device comprising the electrode according to embodiment 15, wherein the electrochemical energy storage device comprises an electrochemical battery or a super-capacitor.

Embodiment 17 is the electrochemical energy storage device according to embodiment 16, wherein the electrochemical battery comprises a lithium battery, a metallic lithium-oxide battery, a metallic lithium-sulfur secondary battery, or a metallic lithium-air battery.

In order to make objects, technical solutions and advantages of the present disclosure more clear and apparent, the present disclosure will be further described in detail below with reference to the drawings and examples. It should be appreciated that the particular examples described here are only intended to explain, but not to limit, the present disclosure. In addition, technical features involved in various examples described below can be combined with each other, as long as they do not conflict with each other.

Moreover, various product structure parameters, various reactants and process conditions used in the following examples are typical instances. However, the inventors have verified through a large number of experiments that other structure parameters, other types of reactants and other process conditions different from those listed above are also applicable, and can also achieve the technical effects as stated in the present disclosure.

Example 1

2 g of multiple-walled carbon nanotubes with an outer diameter of 20 to 30 nm (CHENGDU ORGANIC CHEMICALS CO. LTD. CHINESE ACADEMY OF SCIENCES) and 2 g of acetylene black (Alfa Aesar) were added into 200 mL of deionized water, and then 20 mL of anhydrous ethanol was added. The mixture was sealed, stirred, and sonicated with a 130 W ultrasonic probe for 5 hours to disperse the sample uniformly. After that, the sample was introduced into a spray dryer. The air inlet temperature was set to 200° C., the air outlet temperature was set to 150° C., and the spray pressure was set to 40 MPa, and the sample size was set to 500 mL/h. After drying, an acetylene black-carbon nanotube microsphere composite material was obtained. A nitrogen absorption-desorption test was performed on the composite material, and the result showed that the specific surface area of the microspheres was 103 $m^2/g$, and the average pore size was 15.2 nm.

100 mg of battery-grade metallic lithium and 100 mg of the above acetylene black-carbon nanotube microsphere composite material were weighed, placed into a heater which is inert to the metallic lithium, heated to 200° C. and pre-stirred at 50 rpm for 2 minutes, then stirred at 200 rpm at 230° C. for 20 minutes, and cooled to room temperature after the completion of mixing. The whole procedure was performed in a glove box under protection of argon, where the moisture content was below 10 ppm, and the oxygen content was below 10 ppm. Lithium-carbon composite microparticles were obtained. The result of a weighing test showed that the mass percentage of lithium in the lithium-carbon composite microparticles was 67.3%.

FIG. 1 shows scanning electron microscopy (SEM) images of the acetylene black-carbon nanotube microsphere composite material (images a, b) and the lithium-carbon composite microparticles (images c, d) obtained in Example 1.

Figure 2:
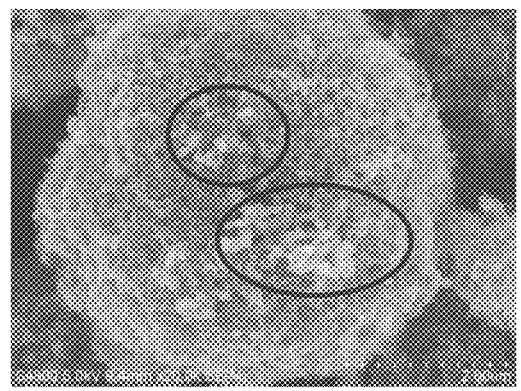
FIG. 2 is an enlarged view (magnification: 20000) of the SEM image b of FIG. 1.

FIG. 2 is an enlarged view (magnification: 20000) of the SEM image b of FIG. 1. The particulates in the circles are the carbon nanoparticles (i.e., the acetylene-black nanoparticles).

Figure 3:
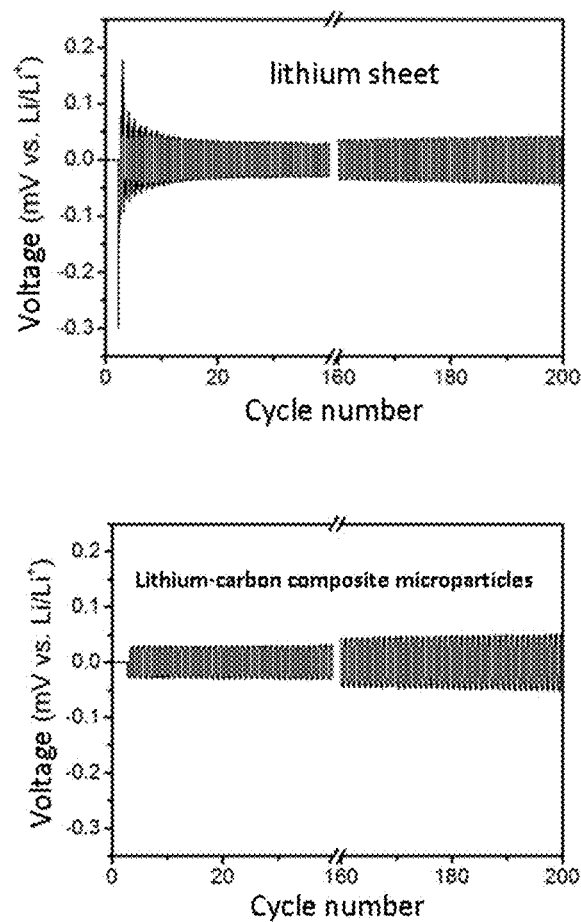
FIG. 3 shows results of half-cell cycle performance tests performed on half-cells composed of the lithium-carbon composite microparticles of Example 1 and composed of a lithium sheet respectively under the conditions of a current density of 0.5 mA·cm$^{-2}$ and a capacity of 0.5 mAh·cm$^{-2}$.

The lithium-carbon composite microparticles obtained above and a lithium sheet were respectively used to form half-cells (20 to 40 mg of the lithium-carbon composite microparticles obtained above were pressed onto a copper foam with a diameter of 1.5 cm and a thickness of 1 mm, and this material was used as the negative electrode; a lithium sheet with a thickness of 400 μm and a diameter of 1.5 cm was used as the positive electrode; and a Celgard separator (membrane) was combined with the above positive and negative electrodes to form a 2025-type coin battery), and half-cell cycle performance tests were performed under the conditions of a current density of 0.5 $mA \cdot cm^{-2}$ and a capacity of 0.5 $mAh \cdot cm^{-2}$. FIG. 3 shows results of the half-cell cycle performance tests, wherein the left diagram is the cycle curve obtained using the lithium-carbon composite microparticles, and the right diagram is the cycle curve of the lithium sheet. As seen from the figure, compared to the lithium metal sheet, the lithium-carbon composite microparticles exhibited a very low polarization voltage at the beginning, indicating the large specific surface area of the material. Furthermore, the polarization voltage did not significantly change at the later stage of the cycle, indicating that the material structure and the surface solid electrolyte interface (SEI) layer were stable.

Figure 4:
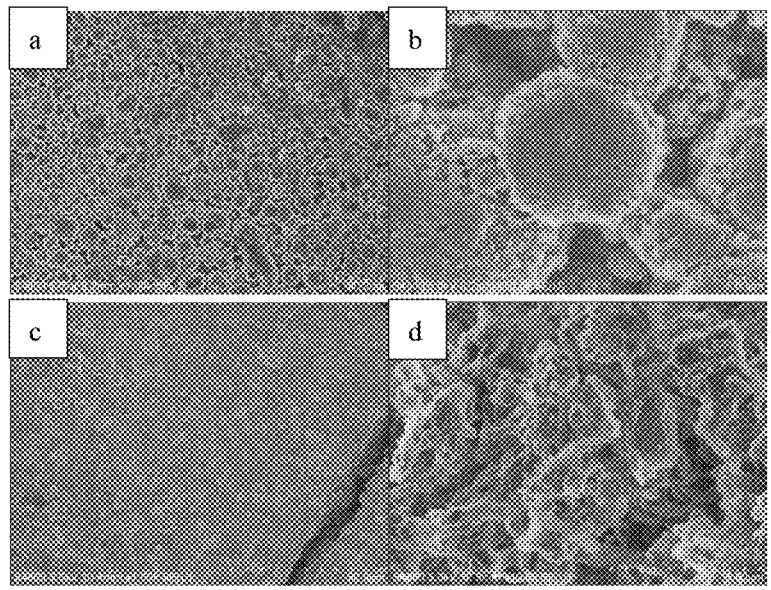
FIG. 4 shows electrode morphologies of half-cells composed of the lithium-carbon composite microparticles of Example 1 and composed of a lithium sheet respectively after 200 cycles under the conditions of a current density of 0.5 mA·cm$^{-2}$ and a capacity of 0.5 mAh·cm$^{-2}$ (images a and b show lithium-carbon composite microparticles, and images c and d show the lithium sheet).

FIG. 4 shows electrode morphologies of half-cells composed of the lithium-carbon composite microparticles and composed of a lithium sheet respectively after 200 cycles under the conditions of a current density of 0.5 $mA \cdot cm^{-2}$ and a capacity of 0.5 $mAh \cdot cm^{-2}$ (images a and b show lithium-carbon composite microparticles, and images c and d show the lithium sheet). For the lithium sheet, dendrites were distributed throughout the sample surface after the cycle, which would bring a great potential risk to the battery. In contrast, for the lithium-carbon microscale composite material, the sample remained a particulate structure after the cycle, which again proved the stability of the material structure during the cycle.

Figure 5:
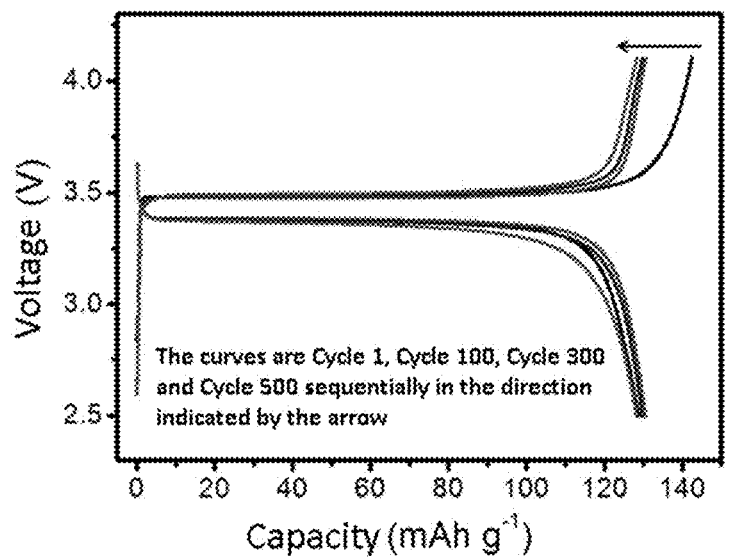
FIG. 5 shows voltage-capacity curves of a half-cell of the lithium-carbon composite microparticles of Example 1/lithium at different cycles during a constant current charge-discharge test.

FIG. 5 shows voltage-capacity curves of a half-cell of the lithium-carbon composite microparticles/lithium at different cycles during a constant current charge-discharge test (with a current density of 0.74 mA/cm$^{-2}$). After 500 cycles at 1 C rate, the capacity of the lithium-carbon composite microparticles did not substantially change, indicating that the surface SEI layer of the material was relatively stable during the cycle, and would not consume metallic lithium continuously.

Figure 6:
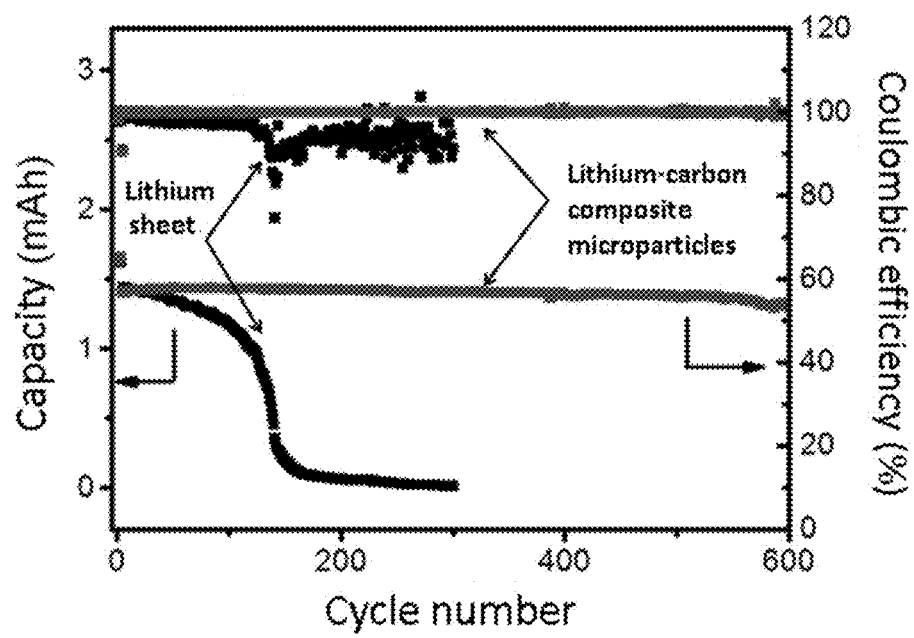
FIG. 6 shows results of capacity retention rate tests on full cells composed of the lithium-carbon composite microparticles of Example 1 and lithium iron phosphate and composed of the lithium sheet and lithium iron phosphate respectively at different cycles at 1 C rate.

The capacity retention rates at different cycles were measured with full cells composed of the lithium-carbon composite microparticles and lithium iron phosphate and composed of lithium sheet and lithium iron phosphate respectively (a material, which was obtained by pressing 20 to 40 mg of the lithium-carbon composite microparticles onto a copper foam with a diameter of 1.5 cm and a thickness of 1 mm, was used as the negative electrode, and a lithium iron phosphate (LFP) electrode sheet (manufactured by Sinlion Battery Tech Co., Ltd., Suzhou, with an area density of 0.7 mAh/cm$^2$) was used as the positive electrode, to form a 2025-type coin battery) at 1 C rate (the capacities of the positive electrode and the negative electrode were 1.4 mAh and 40 mAh respectively). FIG. 6 shows results of the tests. As shown in FIG. 6, after 600 cycles at 1 C rate, the full cell composed of the lithium-carbon composite microparticles and lithium iron phosphate had a discharge capacity retention rate of 92.8%, while the capacity of the full cell with a lithium sheet as the negative electrode decreased continuously, and there was almost no capacity after 150 cycles.

Example 2

Figure 7:
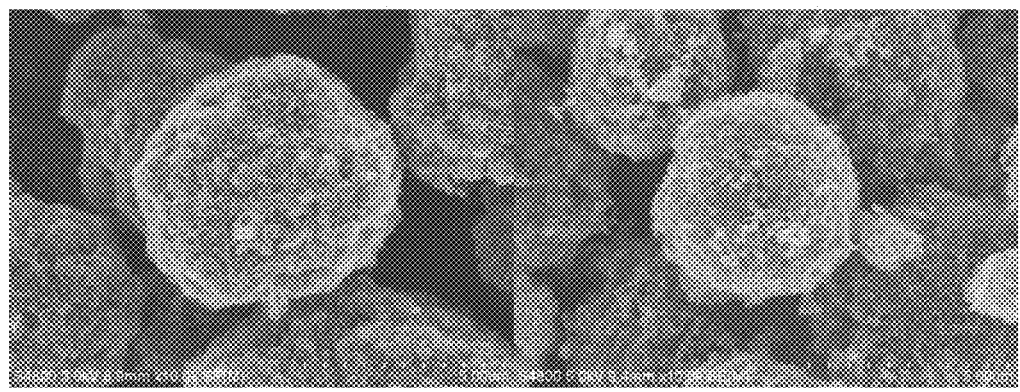
FIG. 7 shows a comparison view between the microsphere materials formed with the carbon nanoparticles and without the carbon nanoparticles respectively, wherein the left image is the image of the microsphere material obtained in Example 2, and the right image is the image of the microsphere material obtained in Example 1.

A carbon nanotube microsphere material was prepared in the same method as Example 1, except that acetylene black was not used. The specific surface area of the microsphere material was 151 m$^2$/g, and the average pore size was 18.7 nm. FIG. 7 shows a comparison view between microsphere materials formed without the carbon nanoparticles (left image) and with carbon nanoparticles (right image). As seen from the figure, the morphology and structure of the microsphere material did not change significantly after the addition of the carbon nanoparticles.

The lithium-carbon composite microparticles were prepared in the same method as Example 1 by using the above carbon nanotube microsphere material, with a mass percentage of the lithium in the lithium-carbon composite microparticles of 40.4%.

Figure 8:
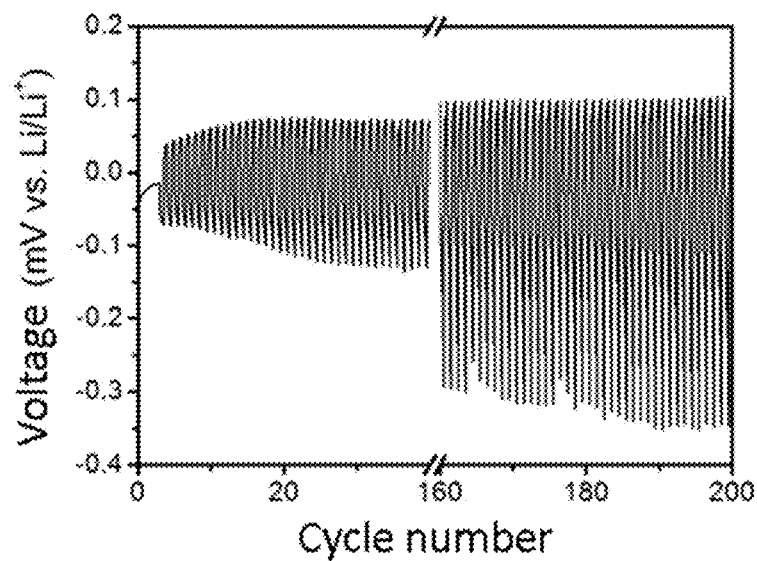
FIG. 8 shows results of half-cell cycle performance tests performed on half-cells composed of the lithium-carbon composite microparticles of Example 2 and composed of a lithium sheet respectively under the conditions of a current density of 0.5 mA·cm$^{-2}$ and a capacity of 0.5 mAh·cm$^{-2}$.

Half-cell cycle performance tests were performed on half-cells composed of the lithium-carbon composite microparticles obtained above and composed of a lithium sheet respectively under the conditions of a current density of 0.5 mA·cm$^{-2}$ and a capacity of 0.5 mAh·cm$^{-2}$. FIG. 8 shows results of the half-cell cycle performance tests. As shown in FIG. 8, for the half-cell formed with the lithium-carbon composite microparticles of Example 2, the polarization voltage of the sample increased continuously as the cycle number increased, indicating that the surface SEI layer of the sample was thickened gradually, which resulted from the continuous reaction of the metallic lithium and the electrolyte.

Example 3

A carbon nanoparticle-porous skeleton composite material and lithium-carbon composite microparticles were prepared in the same method as Example 1, except that Ketjen black (ECP 600JD) was used instead of acetylene black of Example 1. The mass percentage of the lithium in the lithium-carbon composite microparticles was 60.0%. Results of morphology and performance tests of the resultant material were similar to those of Example 1.

Example 4

A carbon nanoparticle-porous skeleton composite material and lithium-carbon composite microparticles were prepared in the same method as Example 1, except that Degussa carbon black (Printex XE-2) was used instead of acetylene black of Example 1. The mass percentage of the lithium in the lithium-carbon composite microparticles was 51.8%. Results of morphology and performance tests of the resultant material were similar to those of Example 1.

Example 5

2 g of carbon nanofibers (Alfa Aesar) and 2 g of acetylene black (Alfa Aesar) were added into 200 mL of deionized water, and then 20 mL of anhydrous ethanol were added. The mixture was sealed, stirred, and sonicated with a 130 W ultrasonic probe for 5 hours to disperse the sample uniformly. After that, the sample was introduced into a spray dryer. The air inlet temperature was set to 200° C., the air outlet temperature was set to 150° C., the spray pressure was set to 40 MPa, and the sample size was set to 500 mL/h. After drying, an acetylene black-carbon nanofiber microsphere composite material was obtained, having a similar morphology to that of the acetylene black-carbon nanotube microsphere composite material of Example 1. A nitrogen absorption-desorption test was performed on the composite material, and results showed that the specific surface area of the microspheres was 98 m$^2$/g, and the average pore size was 13.1 nm.

Figure 9:
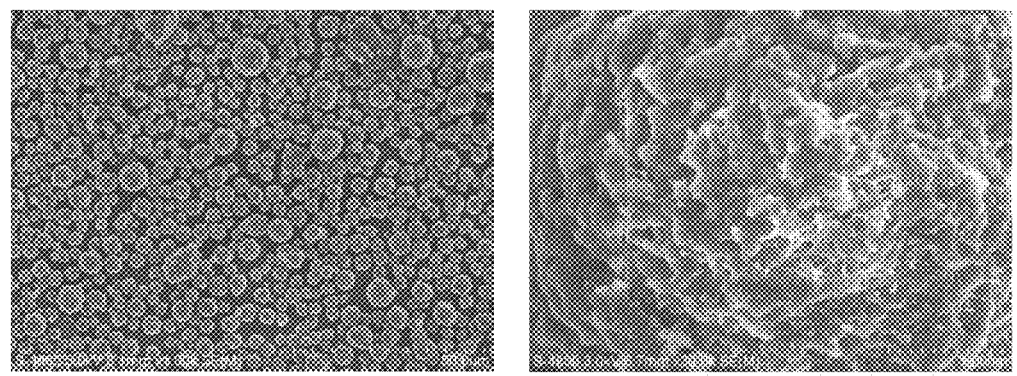
FIG. 9 shows SEM images of the lithium-carbon fiber microsphere composite material of Example 5.

100 mg of battery-grade metallic lithium and 100 mg of the above acetylene black-carbon nanofiber microsphere composite material were weighed, placed into a heater which is inert to the metallic lithium, heated to 200° C. and pre-stirred at 50 rpm for 2 minutes, then stirred at 200 rpm at 230° C. for 20 minutes, and cooled to room temperature after the completion of mixing. The whole procedure was performed in a glove box under protection of argon, where the moisture content was below 10 ppm, and the oxygen content was below 10 ppm. Lithium-carbon composite microparticles were obtained. Results of a weighing test showed that the mass percentage of lithium in the lithium-carbon composite microparticles was 36.3%. FIG. 9 shows SEM images of the lithium-carbon fiber microsphere composite material, wherein the magnification in the left image is 1000, and the magnification in the right image is 25000.

Figure 10:
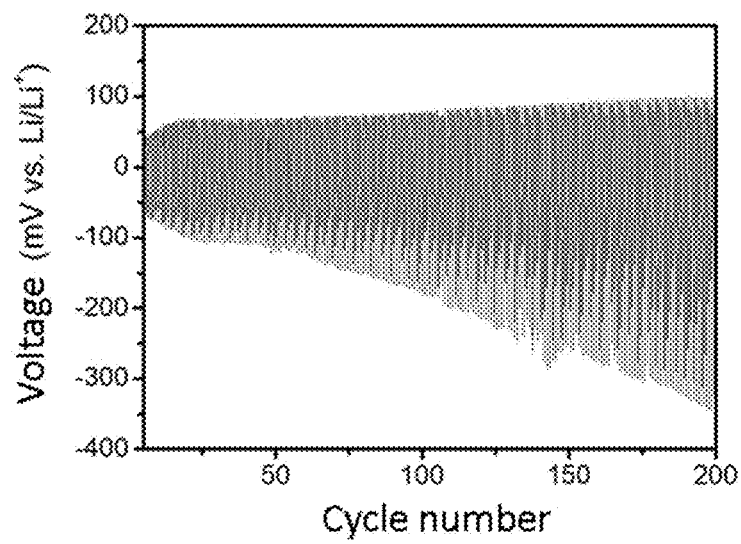
FIG. 10 shows a constant current charge-discharge curve with the lithium-carbon fiber microsphere composite material of Example 5 as the negative electrode.

FIG. 10 shows a constant current charge-discharge curve with the lithium-carbon fiber microsphere composite material as the negative electrode. As seen from the figure, the polarization voltage of the lithium-carbon fiber microsphere composite material was very small at the beginning, indicating that the material had a large specific surface area, which could reduce the current density greatly and effectively inhibit the formation of lithium dendrites. As the potential risk of short circuit caused by dendrites could be avoid, the material was more likely to be used in a practical high energy density battery system.

Example 6

2 g of porous nickel metal (with a pore size distribution within 100 to 500 μm) skeleton material with a diameter of 1.5 cm and a thickness of 500 to 1000 μm was placed in 100 mL of an aqueous solution containing acetylene black (Alfa Aesar) at a concentration of 20 g/L, and then the solution was subjected to a sonication dispersion treatment for 1 h. The resultant mixture was left standing and dried in an oven at 80° C. for 24 h to obtain a porous nickel metal skeleton material containing carbon nanoparticles. The porous nickel metal skeleton material containing carbon nanoparticles was immersed in a molten lithium metal, to obtain a metallic lithium-nickel skeleton material. Results of a weighing test showed that the mass percentage of lithium in the metallic lithium-nickel skeleton material was 50.0% [(the mass of the metallic lithium-nickel skeleton material—the mass of the nickel metal skeleton)/the mass of the metallic lithium-nickel skeleton material].

Figure 11:
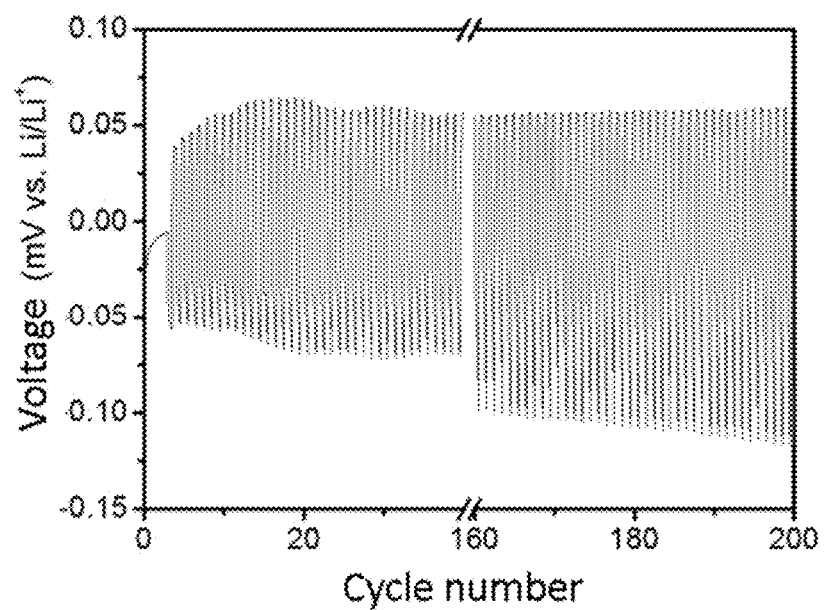
FIG. 11 shows results of a half-cell cycle performance test on a half-cell composed of the metallic lithium-nickel skeleton material of Example 6 under the conditions of a current density of 0.5 mA·cm$^{-2}$ and a capacity of 0.5 mAh·cm$^{-2}$.
Figure 12:
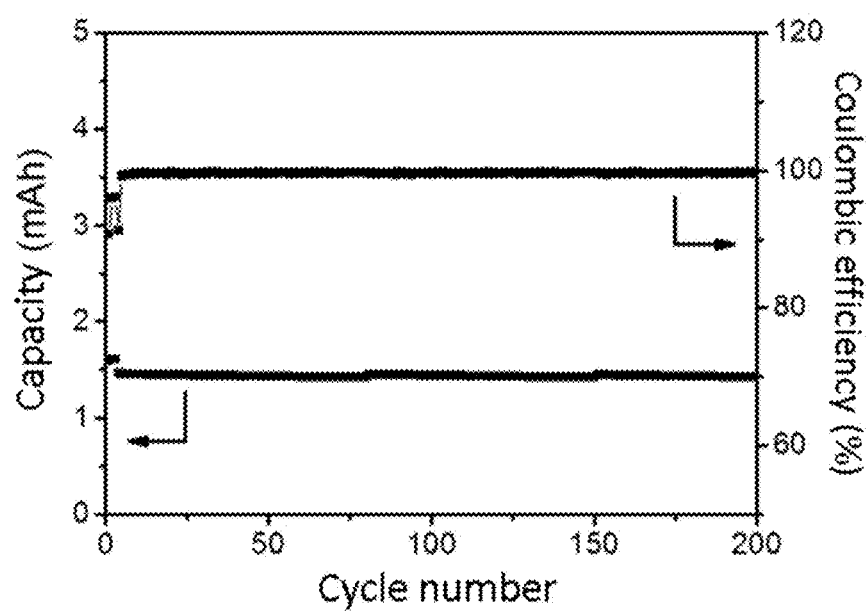
FIG. 12 shows results of capacity retention rate tests on a full cell composed of the metallic lithium-nickel skeleton material of Example 6 and lithium iron phosphate at different cycles at 1 C rate.

A half-cell composed of the metallic lithium-nickel skeleton carbon material was tested for half-cell cycle performance under conditions of a current density of 0.5 mA·cm$^{-2}$ and a capacity of 0.5 mAh·cm$^{-2}$. Result are shown in FIG. 11. As seen from FIG. 11, the polarization voltage of the sample did not substantially change after 200 cycles, and the slight increase resulted from the gradual thickening of the surface SEI layer. In addition, the stability of the capacity and coulombic efficiency under the full cell test condition further indicated the stability of the material structure and the surface SEI layer. The full cell composed of the metallic lithium-nickel skeleton carbon material and lithium iron phosphate was tested at 1 C rate for the capacity retention rate at different cycles. Results are as shown in FIG. 12.

Embodiments are provided according to the following clauses:

1. A carbon nanoparticle-porous skeleton composite material, characterized in that the porous skeleton is a carbon-based porous microsphere material with a diameter of 1 to 100 μm or a porous metal material having internal pores with a micrometer-scale pore size distribution, and the carbon nanoparticles are distributed in the pores and on the surface of the carbon-based porous microsphere material or the porous metal material.

2. The carbon nanoparticle-porous skeleton composite material according to clause 1, characterized in that the carbon-based porous microsphere material comprises at least one selected from the group consisting of a carbon nanotube or carbon nanofiber microsphere material, graphite, mesocarbon microspheres, and porous activated carbon, wherein the carbon nanotube or carbon nanofiber microsphere material is formed by entangling and agglomerating carbon nanotubes or carbon nanofibers with each other, and the microsphere is full of carbon nanotubes or carbon nanofibers in its interior, with a large number of nanoscale pores being present in its interior and on its surface; and/or
the porous metal material comprises at least one selected from the group consisting of porous copper, porous aluminum, porous zinc, porous iron, porous nickel, porous gold, and porous silver; and/or
the carbon nanoparticles comprise at least one selected from the group consisting of carbon black, acetylene black, Ketjen black, Timcal Super P conductive additive, and Cabot BP2000 carbon black.

3. The carbon nanoparticle-porous skeleton composite material according to clause 1 or 2, characterized in that the carbon nanoparticles may have a size of 1 to 500 nm, preferably 50 to 200 nm.

4. The carbon nanoparticle-porous skeleton composite material according to any one of clauses 1 to 3, characterized in that the carbon nanoparticles have a content of 20 to 500 wt % with respect to the porous skeleton.

5. The carbon nanoparticle-porous skeleton composite material according to any one of clauses 2 to 4, characterized in that the carbon nanotube or carbon nanofiber microsphere material has a specific surface area of 100 to 1500 m$^2$/g; and/or
the pores contained in the carbon nanotube or carbon nanofiber microsphere material have a pore size of 1 to 200 nm; and/or
the carbon nanotube or carbon nanofiber microsphere material at least has any one selected from the group consisting of a microspherical entities agglomeration structure, a spherical agglomeration structure, a spheroidal agglomeration structure, a porous spherical agglomeration structure, and a donut-shaped agglomeration structure; and/or
the carbon nanotubes comprises any one selected from the group consisting of multiple-walled carbon nanotubes, double-walled carbon nanotubes and single-walled carbon nanotubes, or a combination of two or more thereof, and optionally the carbon nanotubes are subjected to a surface functionalization treatment.

6. A method for preparing the carbon nanoparticle-porous skeleton composite material according to any one of clauses 1 to 5, the method comprising:
dispersing carbon nanotubes or carbon nanofibers in a solvent together with carbon nanoparticles to form a dispersion, and then spray drying the dispersion; or
immersing microscale porous graphite, mesocarbon microspheres, porous activated carbon or a porous metal material in a solution containing carbon nanoparticles, sonicating and then drying the resultant material.

7. The method according to clause 6, characterized in that a process of spray drying the carbon nanotubes or the carbon nanofibers together with the carbon nanoparticles comprises the steps of:
A. dispersing the carbon nanotubes/carbon nanofibers and the carbon nanoparticles in a dispersion solvent (surfactant-free) through a sonication treatment to obtain a dispersion;
B. spraying the dispersion obtained in step A out through a nozzle of a spray dryer, at a preset air inlet temperature and a preset air outlet temperature, wherein the dispersion is kept under stirring during the spraying; and
C. cooling the resultant material, thereby obtaining the carbon nanoparticle-carbon nanotube/carbon nanofiber microsphere composite material.

8. The method according to clause 7, characterized in that a mass ratio between the carbon nanoparticles and the carbon nanotubes/carbon nanofibers in step A is 0.5:1 to 8:1; and/or
a concentration of the carbon nanotubes/carbon nanofibers in the dispersion is 10 to 50 g/L; and/or
the dispersion solvent comprises any one selected from the group consisting of water, aqueous ammonia, hydrochloric acid solution, ethanol, acetone, and isopropanol, or a combination thereof.

9. The method according to clause 7 or 8, characterized in that the air inlet temperature is 190 to 210° C., and the air outlet temperature is 90 to 110° C.; and/or a speed of the spraying is 1 mL/min to 100 L/min.

10. The method according to clause 6, characterized in that the solution containing carbon nanoparticles comprises an aqueous solution containing carbon nanoparticles; and/or
a concentration of the carbon nanoparticles in the solution containing carbon nanoparticles is 5 to 50 g/L.
11. A metallic lithium-carbon nanoparticle-porous skeleton composite material, characterized in that it comprises the carbon nanoparticle-porous skeleton composite material according to any one of clauses 1 to 5, and metallic lithium distributed in the pores and on the surface of the carbon nanoparticle-porous skeleton composite material.
12. The lithium-carbon nanoparticle-porous skeleton composite material according to clause 11, characterized in that the metallic lithium is 1% to 95% by mass of the total mass of the lithium-carbon nanoparticle-porous skeleton composite material.
13. A method for preparing a metallic lithium-carbon nanoparticle-porous skeleton composite material, the method comprising: mixing a molten lithium metal with the carbon nanoparticle-porous skeleton composite material according to any one of clauses 1 to 5, and then cooling the mixture.
14. The method according to clause 13, characterized in that the mixing the molten lithium metal with the carbon nanoparticle-carbon-based porous microsphere composite material comprises:
mixing the lithium metal with the carbon-based porous microsphere material under stirring and heating; or
immersing the carbon nanoparticle-porous metal composite material in the molten lithium metal.
15. The method according to clause 14, characterized in that the mixing under stirring comprises a pre-stirring step and a rapid stirring step, wherein the pre-stirring step comprises stirring a mixture of the lithium metal and the carbon nanoparticle-porous skeleton composite material at a speed of 50 rpm to 100 rpm at 200° C. to 230° C. for 1 to 5 minutes, and the rapid stirring step comprises rapidly stirring at a speed of 150 rpm to 1000 rpm at 230° C. to 300° C.
16. An electrode comprising the lithium-carbon nanoparticle-porous skeleton composite material according to clause 11 or 12.
17. An electrochemical energy storage device comprising the electrode according to clause 16, wherein the electrochemical energy storage device comprises an electrochemical battery or a super-capacitor.
18. The electrochemical energy storage device according to clause 17, characterized in that the electrochemical battery comprises a lithium battery, a metallic lithium-oxide battery, a metallic lithium-sulfur secondary battery, or a metallic lithium-air battery.

It should be appreciated that the above descriptions are only some preferred embodiments of the present disclosure, but not intended to limit the present disclosure. Any variations, equivalents, modifications and the like made within the spirit and principle of the present disclosure should be included within the protection scope of the present disclosure.

What is claimed is:
1. A lithium-carbon nanoparticle-porous skeleton composite material, comprising:
a carbon nanoparticle-porous skeleton composite material comprising:
a porous skeleton comprising a carbon-based porous microsphere material with a diameter of 1 to 100 μm, wherein the carbon-based porous microsphere material is a carbon nanotube or carbon nanofiber microsphere material, wherein the carbon nanotube or carbon nanofiber microsphere material has a microsphere structure formed by entangling and agglomerating carbon nanotubes or carbon nanofibers with each other, and the interior of the microsphere is full of carbon nanotubes or carbon nanofibers, but there are nanoscale pores between the entangled and agglomerated carbon nanotubes or carbon nanofibers, so that said microsphere structure comprises nanoscale pores in its interior and on its surface, and
carbon nanoparticles distributed in at least some of the pores, and on the surface, of the carbon-based porous microsphere material, wherein the carbon nanoparticles comprise at least one selected from the group consisting of carbon black and acetylene black; and
metallic lithium distributed in at least some of the pores, and on the surface, of the carbon nanoparticle-porous skeleton composite material,
wherein the metallic lithium is 50 to 70% by mass of the total mass of the lithium-carbon nanoparticle-porous skeleton composite material and is present mainly in the pores of the composite material together with the carbon nanoparticles.
2. The lithium-carbon nanoparticle-porous skeleton composite material according to claim 1, wherein the carbon nanoparticles have a size of 1 to 500 nm.
3. The lithium-carbon nanoparticle-porous skeleton composite material according to claim 1, wherein the carbon nanoparticles have a content of 20 to 500 wt % with respect to the porous skeleton.
4. The lithium-carbon nanoparticle-porous skeleton composite material according to claim 1, wherein the pores contained in the carbon nanotube or carbon nanofiber microsphere material have a pore size of 1 to 200 nm.
5. An electrode comprising the lithium-carbon nanoparticle-porous skeleton composite material according to claim 1.
6. An electrochemical energy storage device comprising the electrode according to claim 5, wherein the electrochemical energy storage device comprises an electrochemical battery or a super-capacitor.
7. The electrochemical energy storage device according to claim 6, wherein the electrochemical battery comprises a lithium battery, a metallic lithium-oxide battery, a metallic lithium-sulfur secondary battery, or a metallic lithium-air battery.
8. A method for preparing a metallic lithium-carbon nanoparticle-porous skeleton composite material, the method comprising mixing a molten lithium metal with the carbon nanoparticle-porous skeleton composite material according to claim 1, and then cooling the mixture.
9. The method according to claim 8, wherein the mixing the molten lithium metal with the carbon nanoparticle-porous skeleton composite material comprises mixing the lithium metal with the carbon nanoparticle-porous skeleton composite material under stirring and heating.
10. The method according to claim 9, wherein the mixing under stirring comprises a pre-stirring step and a rapid stirring step, wherein the pre-stirring step comprises stirring a mixture of the lithium metal and the carbon nanoparticle-porous skeleton composite material at a speed of 50 rpm to 100 rpm at 200° C. to 230° C. for 1 to 5 minutes, and the rapid stirring step comprises rapidly stirring at a speed of 150 rpm to 1000 rpm at 230° C. to 300° C.

11. The method according to claim 8, wherein the carbon nanoparticle-porous skeleton composite material is prepared by:
dispersing carbon nanotubes or carbon nanofibers in a solvent together with carbon nanoparticles to form a dispersion, and then spray drying the dispersion; or
immersing microscale porous graphite, mesocarbon microspheres, or porous activated carbon in a solution containing carbon nanoparticles, sonicating and then drying the resultant material.

12. The method according to claim 11, comprising the dispersing carbon nanotubes or carbon nanofibers in a solvent together with carbon nanoparticles to form a dispersion, and then spray drying the dispersion, the dispersing and spray drying comprising:
A. dispersing the carbon nanotubes/carbon nanofibers and the carbon nanoparticles in a dispersion solvent (surfactant-free) through a sonication treatment to obtain a dispersion;
B. spraying the dispersion obtained in step A out through a nozzle of a spray dryer, at a preset air inlet temperature and a preset air outlet temperature, wherein the dispersion is kept under stirring during the spraying; and
C. cooling the resultant, thereby obtaining the carbon nanoparticle-porous skeleton composite material.

13. The method according to claim 12, wherein a mass ratio between the carbon nanoparticles and the carbon nanotubes/carbon nanofibers in step A is 0.5:1 to 8:1.

14. The method according to claim 12, wherein the air inlet temperature is 190 to 210° C.

15. The method according to claim 11, comprising the immersing microscale porous graphite, mesocarbon microspheres, or porous activated carbon in a solution containing carbon nanoparticles, sonicating and then drying the resultant material, wherein the solution containing carbon nanoparticles comprises an aqueous solution containing carbon nanoparticles.

16. The method according to claim 8, wherein the mixing the molten lithium metal with the carbon nanoparticle-porous skeleton composite material comprises immersing the carbon nanoparticle-porous skeleton composite material in the molten lithium metal.

\* \* \* \* \*